United States Patent
Pruneri et al.

(10) Patent No.: US 7,155,102 B2
(45) Date of Patent: Dec. 26, 2006

(54) METHOD AND STRUCTURE OF ELECTRIC FIELD POLING OF TI INDIFFUSED LINBO₃ SUBSTRATES WITHOUT THE USE OF GRINDING PROCESS

(75) Inventors: Valerio Pruneri, San Donato Milanese (IT); Federico Lucchi, San Donato Milanese (IT); Paolo Vergani, San Donato Milanese (IT)

(73) Assignee: Avanex Corporation, Fremont, CA (US)

( * ) Notice: Subject to any disclaimer, the term of this patent is extended or adjusted under 35 U.S.C. 154(b) by 116 days.

(21) Appl. No.: 10/871,298

(22) Filed: Jun. 19, 2004

(65) Prior Publication Data

US 2005/0281523 A1  Dec. 22, 2005

(51) Int. Cl.
G02B 6/13 (2006.01)
G02B 6/10 (2006.01)
G02B 6/12 (2006.01)

(52) U.S. Cl. .......................... 385/129; 385/4; 385/14; 359/321

(58) Field of Classification Search ..................... None
See application file for complete search history.

(56) References Cited

U.S. PATENT DOCUMENTS

2003/0031400 A1* 2/2003 Pruneri ........................ 385/14

OTHER PUBLICATIONS

Yi et al. ("Periodic Domain-Inversion of Lithium Niobate without a Planar Inverted Layer", Lasers and Electro-Optics Society Annual Meeting, 1993, LEOS '93 Conference Proceedings, IEEE, Nov. 15-18, 1993, pp. 332-333).*

Schreiber et al. (Efficient cascaded difference frequency conversion in periodically poled Ti:LiNbO3 waveguides using pulsed and cw pumping, Appl. Phys. B 73, 501-504, 2001).*

Armenise ("Fabrication techniques of lithium niobate waveguides", IEE Proceedings, vol. 135, Pt.J, No. 2, Apr. 1988, pp. 85-91).*

Griffiths et al. ("Analysis of Titanium Diffused Planar Optical Waveguides in Lithium Niobate", IEEE Journal of Quantum Electronics, vol. QE-20, No. 2, Feb. 1984, pp. 149-159).*

Boqiang et al. ("Optical Properties of LiNbO3 with Ion Implantation and Titanium Thermal Diffusion", Applications of Ferroelectrics, 1992, ISAF '92, Aug. 30-Sep. 2, 1992, pp. 617-620).*

Amin J. et al. "Blue light generation in a periodically poled Ti:LiNbO₃ channel waveguide", Optics Communications 135, 41 (1997).

(Continued)

Primary Examiner—Michelle Connelly-Cushwa
(74) Attorney, Agent, or Firm—Patterson & Sheridan

(57) ABSTRACT

A method and structure are disclosed with a simplified approach for fabricating a LiNbO3 wafer with Ti indiffusion wafeguide on the surface that is domain inverted. The method involves indiffusing Ti into LiNbO₃ with a predefined temperature and time indiffusion range, a Li enriched and dry oxygen atmosphere, which allows making optical waveguides on the z− crystal face without any significant domain inversion occurring on the z+ face of the crystal. This allows for subsequent poling without the need of any additional removal of the thin domain inverted layer which would otherwise appear on the z+ face. Even in instance where a thin domain inversion layer is formed, it is insufficient thick to prevent poling, eliminating the need for the grinding process.

12 Claims, 8 Drawing Sheets

OTHER PUBLICATIONS

Schreiber G. et al. "Efficient cascading difference frequency conversion in periodically poled Ti:LiNbO$_3$ waveguide using pulse and cw pumping", Applied Physics B 73, 501 (2001).

Thaniyavarn S. et al. "Domain inversion effects in Ti-LiNbO$_3$ integrated optical devices", Appl. Phys. Lett. 46, 933 (1985).

Nakamura K. et al. "Ferroelectric domain inversion caused in LiNbO$_3$ plates by heat treatment", Appl. Phys. Lett. 50, 1413 (1987).

K. S. Buritskii, V. A. Chernykh: "Properties of LiNbO3: Ti waveguides with suppressed outdiffusion of Li2O" Soviet Journal of Quantum Electronics, vol. 16, No. 10, Oct. 1, 1986, pp. 1424-1426, XP009054323 *p. 1424 and p. 1426, right hand column.

J. L. Jackel: "Suppression of outdiffusion in titanium diffused LiNbO3: A review", Journal of Optical Communications, vol. 3, No. 3, Sep. 1, 1982, pp. 82-85, XP009054385 *sections 1, 2, 5.

M. N. Armenise: "Fabrication Techniques of Lithium Niobate Waveguides" IEE Proceedings j. Optoelectronics, Institution of Electrical Engineers, Stevenage, GB, vol. 135, No. 2, Part J, Apr. 1, 1988, pp. 85-91, XP000005714, ISSN: 0267-3932, *section 2.

H. Kanbara, et al.: "All-Optical Switching Based On Cascading Of Second-Order Nonlinearities In A Periodically Poled Titanium-Diffused Lithium Niobate Waveguide", IEEE Photonics Technology Letters, IEEE Inc. New York, U.S., vol. 11, No. 3, Mar. 1999, pp. 328-330, XP000823470, ISSN: 1041-1135, *sections I. and II.

M. Yamada, N. Nada, M. Saithoh, K Watanabe: "First-order quasi-phasematched LiNbO3 waveguides periodically poled by applying an external electric field for efficient SHG", Nonlinear Optics, vol. 7, No. 3-4, Mar. 10, 1993, pp. 333-337, XP009054286, *p. 334; Figure 2.

G. Rosenman, V. D. Kugel, D. Shur: "Diffusion-induced domain inversion in ferroelectrics" Ferrolectrics, vol. 172, No. 1-4, Sep. 6, 1994, pp. 7-18, XP009054285, *the whole document.

W. Karthe, R. Muller: "Integrierte Optik" 1991, Akademische Verlagsgesellschaft Geest & Portig K. G., Leipzig, XP002348092, *p. 14-p. 153.

A. F. Holleman, E. Wiberg: "Lehrbuch der anorganischen Chemie", 1976, Walter De Gruyter, Berlin, XP002348093, *p. 707-p. 710.

EP Search Report, Patent Application No. 05 105 352.8, dated Oct. 7, 2005.

* cited by examiner

METHOD AND STRUCTURE OF ELECTRIC FIELD POLING OF TI INDIFFUSED LINBO₃ SUBSTRATES WITHOUT THE USE OF GRINDING PROCESS

BACKGROUND INFORMATION

1. Field of the Invention

The invention relates generally to the field of optics, and more particularly to substrates and wafers of optical devices.

2. Description of Related Art

Lithium Niobate ($LiNbO_3$) is a type of ferroelectric materials in which the second-order nonlinear optical properties, including electro-optic and nonlinear optic properties, are intrinsically related to the crystal orientation, some time referred to as poling orientation or domain. One can purchase $LiNbO_3$ substrates or wafers commercially that are up to 5" in diameter which are already poled during or after the crystal growth. These wafers thus present single domain structures, i.e. the same c- or z-axis orientation over the whole volume.

In a conventional solution, the Ti (Titanium) indiffusion is accompanied by $Li_2O$ outdiffusion from the crystal surface. The $Li_2O$ outdiffusion is usually accompanied by domain inversion at the z+ crystal surface. When the domain inversion on the z+ crystal surface occurs, the result is usually a thin (up to few tens of μm) domain inverted layer, which is oppositely oriented with respect to the initial crystal domain structure. The closer the temperature to the Curie point (1145° C.), the more significant the formation of the thin domain layer on the z+ surface.

One shortcoming in this approach occurs after Ti indiffusion when it is necessary to carry out a grinding step on the z+ surface of the crystal in order to remove a thin domain inverted layer, which brings the crystal to a thinner single domain structure with optical waveguides on the z− surface. After removal of this thin layer, the crystal can be poled.

Besides being expensive and time consuming, the grinding can be detrimental for the mechanical resistance of the crystal. In particular, most of the processing is performed at a wafer level before dicing into chips. Any crystal weakness introduced by grinding, it may result in breakage of the wafer during subsequent processing steps and loss of all the chips.

Accordingly, there is a need for a method and structure for electric field poling of Ti indifussed $LiNbO_3$ substrates without the use of grinding process.

SUMMARY OF THE INVENTION

The invention discloses a method and structure with a simplified approach for fabricating a $LiNbO_3$ wafer with a Ti indiffusion waveguide on the surface that is domain inverted. The method involves indiffusing Ti into $LiNbO_3$ with a predefined temperature and time indiffusion range, a Li enriched and dry oxygen atmosphere, which allows making optical waveguides on the z− crystal face without any domain inversion occurring on the z+ face of the crystal. This allows for subsequent poling without the need of any additional removal of the thin domain inverted layer which would otherwise appear on the z+ face. Even in instance where a thin domain inversion layer is formed, it is insufficiently thick to prevent poling, eliminating the need of the grinding process.

A waveguide fabrication method comprises providing a predefined temperature with a time indiffusion range; diffusing Ti into the $LiNbO_3$ substrate in a furnace at a specified temperature and atmosphere; and forming an optical waveguide on the z− crystal face without any detrimental domain inversion occurring on the z+ crystal face.

Advantageously, the present invention eliminates mechanical flaws that can be injected into a crystal during the grinding step by Ti indiffusion without the growth of a thin layer on the z+ surface.

Other structures and methods are disclosed in the detailed description below. This summary does not purport to define the invention. The invention is defined by the claims.

DETAILED DESCRIPTION OF PREFERRED EMBODIMENT(S)

Figure 1:
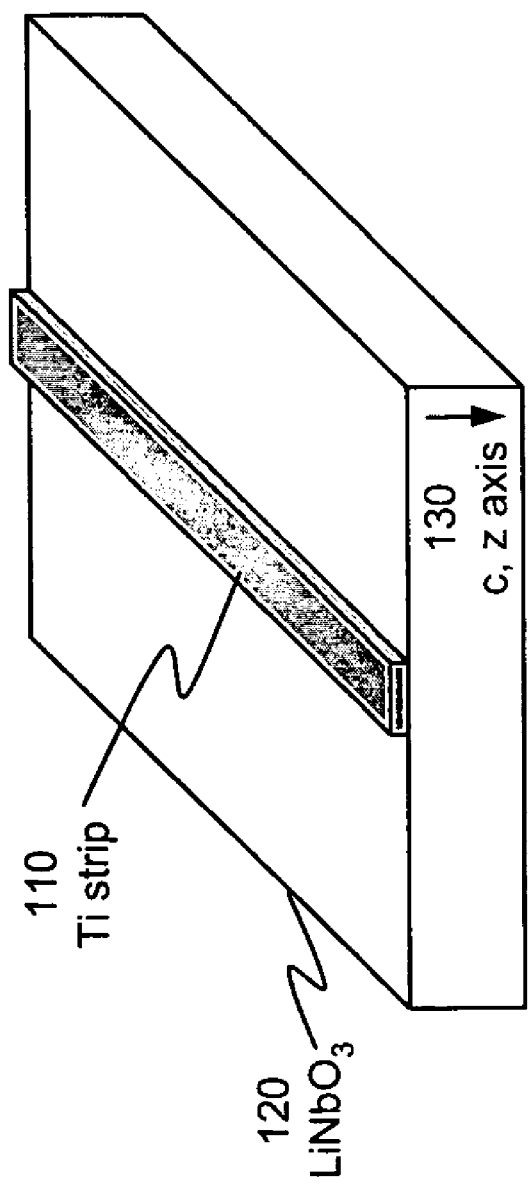
FIG. 1 depicts a structural diagram illustrating a single domain structure with a predefined pattern of metallic Ti strip in accordance with the present invention.

Referring now to FIG. 1, there is shown a structural diagram illustrating a single domain structure 100 with a predefined pattern of metallic Ti strip 110. The Ti strip 110 is photographically defined on the top surface of a $LiNbO_3$ substrate or wafer 120. An example of a suitable $LiNbO_3$ wafer 120 is about 3" in diameter and 0.5 mm thick. The single domain structure 100 possesses the same c-axis orientation or z-axis orientation 130 over the whole volume.

Figure 2:
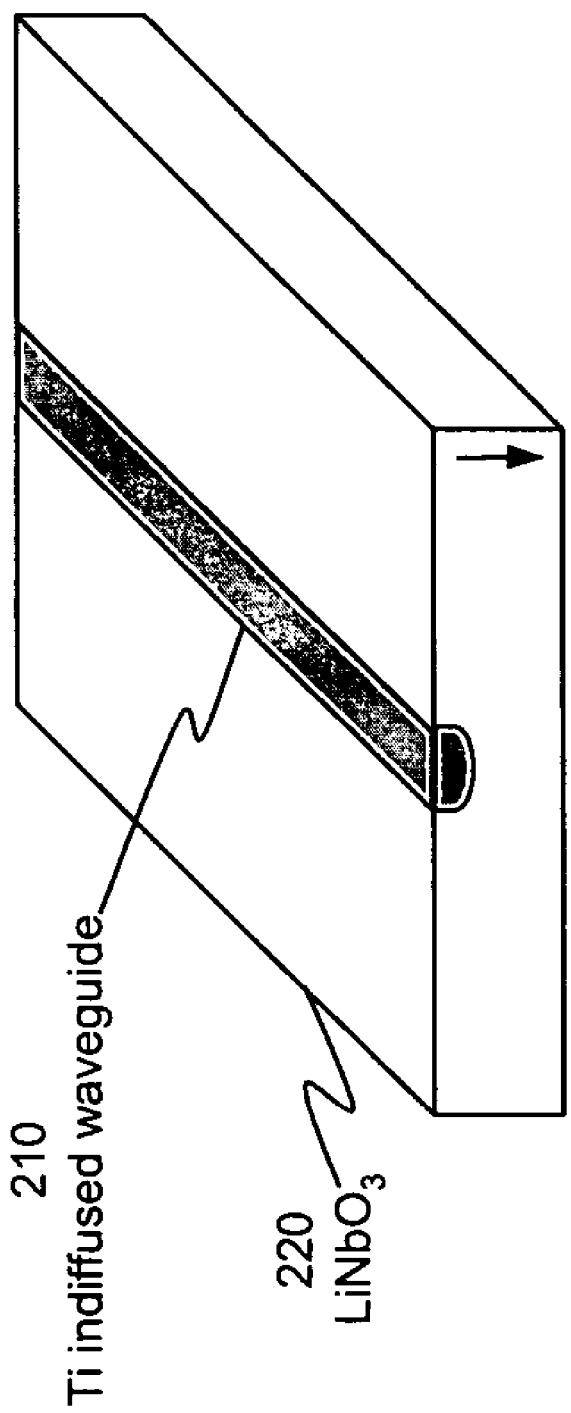
FIG. 2 depicts a structural diagram illustrating a single domain structure after Ti indiffusion in accordance with the present invention.

FIG. 2 illustrates a structural diagram of a single domain structure 200 after Ti indiffusion. An objective is to produce one or more Ti indiffused waveguides on a $LiNbO_3$ substrate or wafer, followed by domain inversion. The Ti indiffusion is performed in a furnace either at a low temperature, and/or in a lithium and oxygen enriched atmosphere, or a combination of both. The low temperature and $Li/O_2$ enriched atmosphere help to prevent $Li_2O$ outdiffusion. In one example, the Ti indiffusion is conducted in a furnace at a temperature of 1030° C. for 9 hours in an atmosphere of dry oxygen into a $LiNbO_3$ substrate 220, so that the index of refraction of the crystal is increased locally for the formation of one or more waveguides 210. The use of low temperature (i.e., a temperature further from the Curie point) reduces local domain inversion at the z+ surface (the lower the temperature, the higher the required local coercive field).

In the Ti indiffusion process described with respect to FIG. 2, it does not induce any significant domain inversion on the z+ face of the crystal, which may be attributed to a reduced or absent $Li_2O$ outdiffusion. Even if a small amount of domain inversion that may occur, it is not sufficient to prevent ohmic current flow, thus subsequent poling. However, if the Ti indiffusion is performed at higher temperatures in the same atmosphere, domain inversion would take place that may prevent subsequent poling.

Figure 3:
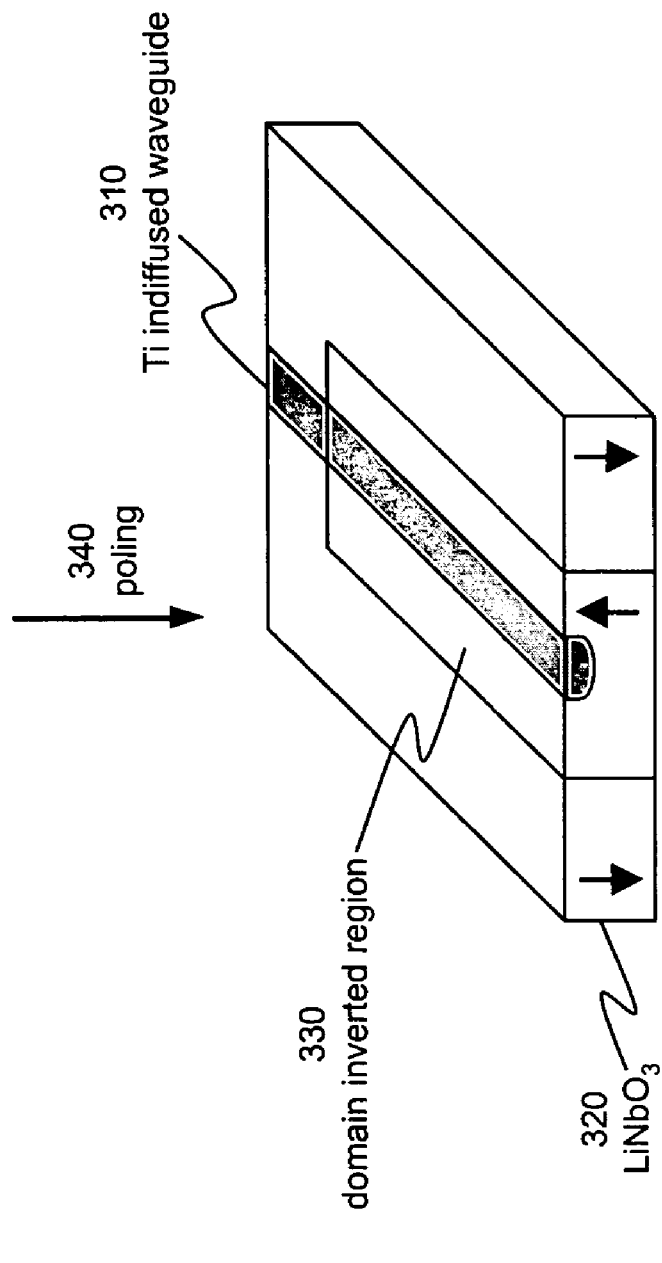
FIG. 3 depicts a structural diagram illustrating the single domain structure with a domain inverted region in accordance with the present invention.

In FIG. 3, there is shown a structural diagram illustrating the single domain structure 300 with a domain inverted region. In addition to the Ti indiffusion waveguide 310, a predefined pattern 330 of insulating material (preferably $SiO_2$) is formed on the z− face of the crystal. High voltage pulses are applied via liquid electrodes (e.g. LiCl or KCl diluted in water) and poling 340 is obtained where the insulating layer is absent (i.e. where the liquid electrode is in direct contact with a $LiNbO_3$ wafer 320).

Figure 4:
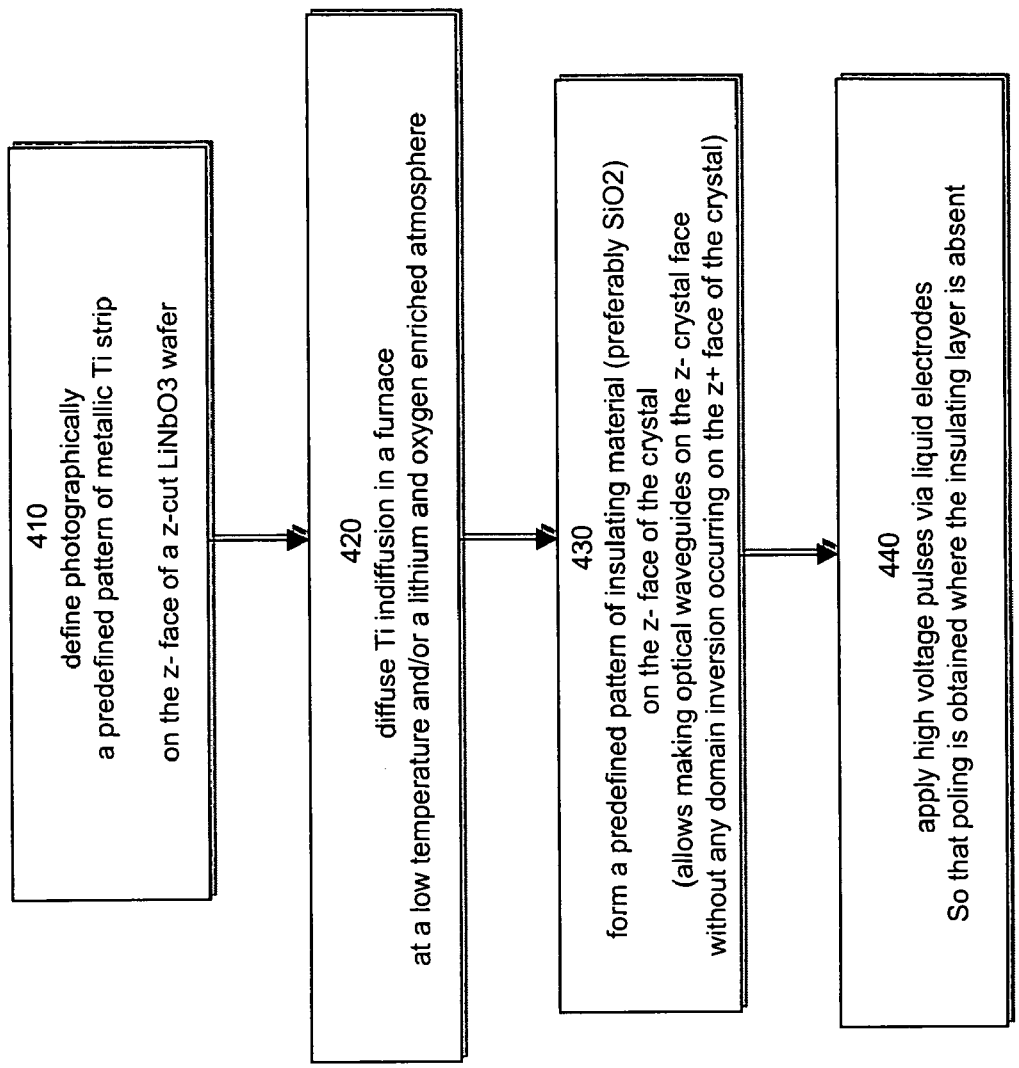
FIG. 4 depicts a flow diagram illustrating the waveguide fabrication process of electric field poling of a Ti indiffused LiNbO3 substrate in accordance with the present invention.

Turning now to FIG. 4, there is shown flow diagram illustrating the waveguide fabrication process 400 of electric field poling of a Ti indiffused LiNbO3 substrate. At step 410, the process 400 defines photographically a predefined pattern of metallic Ti strip on the z− face of a z-cut $LiNbO_3$ substrate or wafer. The specification of the LiNbO3 wafer, of example, can be 3" in diameter and 0.5 mm thick. At step 420, the process 400 performs a Ti indiffusion in a furnace such that a domain inversion is prevented on the z+ crystal face, thereby eliminating the need for grinding. This can be accomplished either solely or in combination with the steps of (a) diffuse Ti indiffusion in a furnace at a low temperature, and/or (b) diffuse Ti indiffusion in a furnace with a lithium and oxygen enriched atmosphere. In one example, the Ti indiffusion is performed in a furnace at a temperature of 1030° C. for 9 hours in an atmosphere of dry oxygen, so that suitable waveguides can be formed. At step 430, the process 400 forms a predefined pattern of insulating material (e.g. $SiO_2$) on the z− face of the crystal. At step 440, the process 400 applies high voltage pulses via liquid electrodes (e.g. LiCl or KCL diluted in water) so that poling is obtained where the insulating layer is absent (i.e. where the liquid electrode is in direct contact with the $LiNbO_3$.

Figure 5:
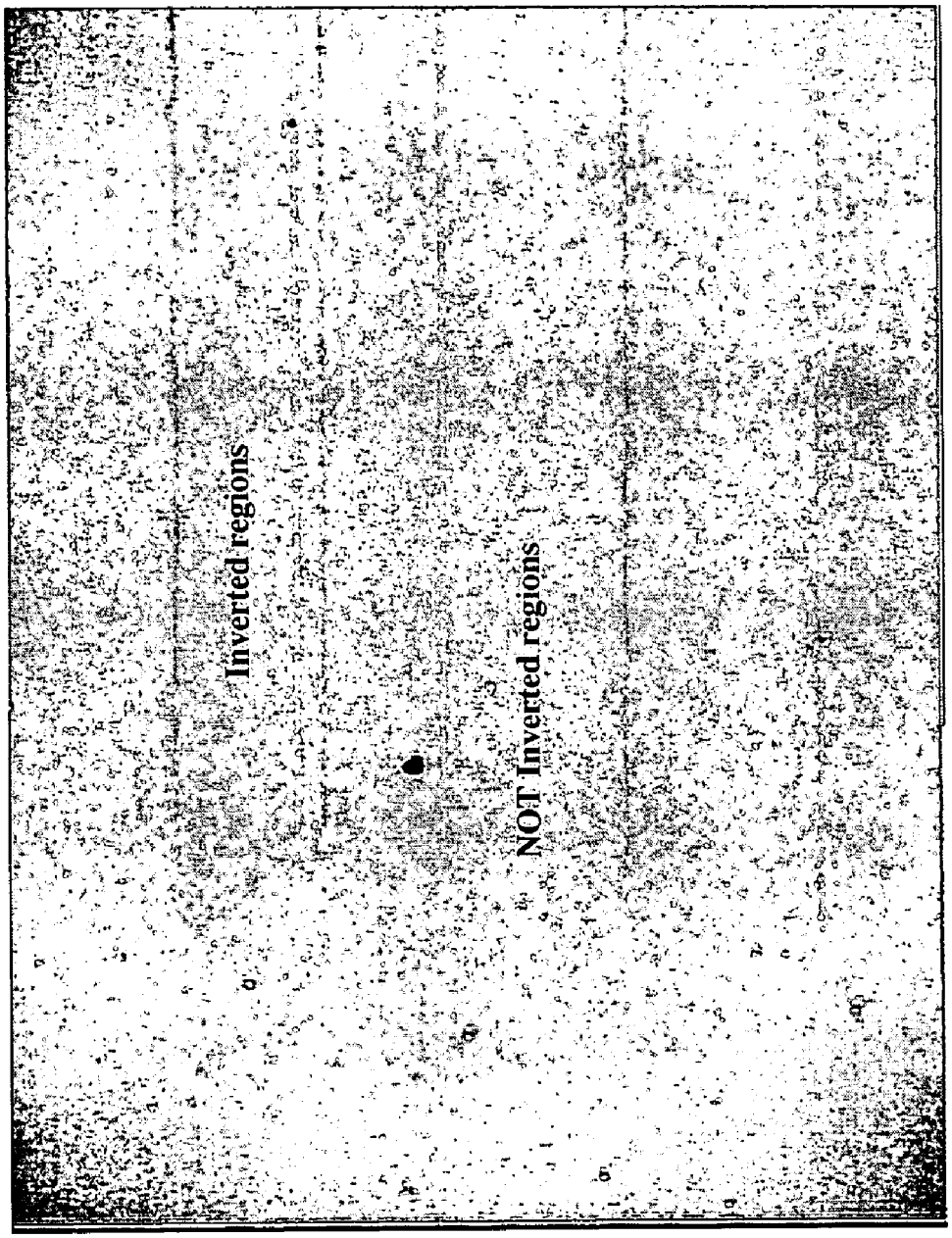
FIG. 5 depicts a graphical diagram illustrating a LiNbO3 inverted zone captured by an optical microscopy in accordance with the present invention.

A graphical diagram illustrating a $LiNbO_3$ inverted zone captured by an optical microscopy is shown in FIG. 5. The domain inverted regions in $LiNbO_3$ are formed after performing the waveguide fabrication process 400. Using this approach, there is no need for grinding or polishing.

Figure 6:
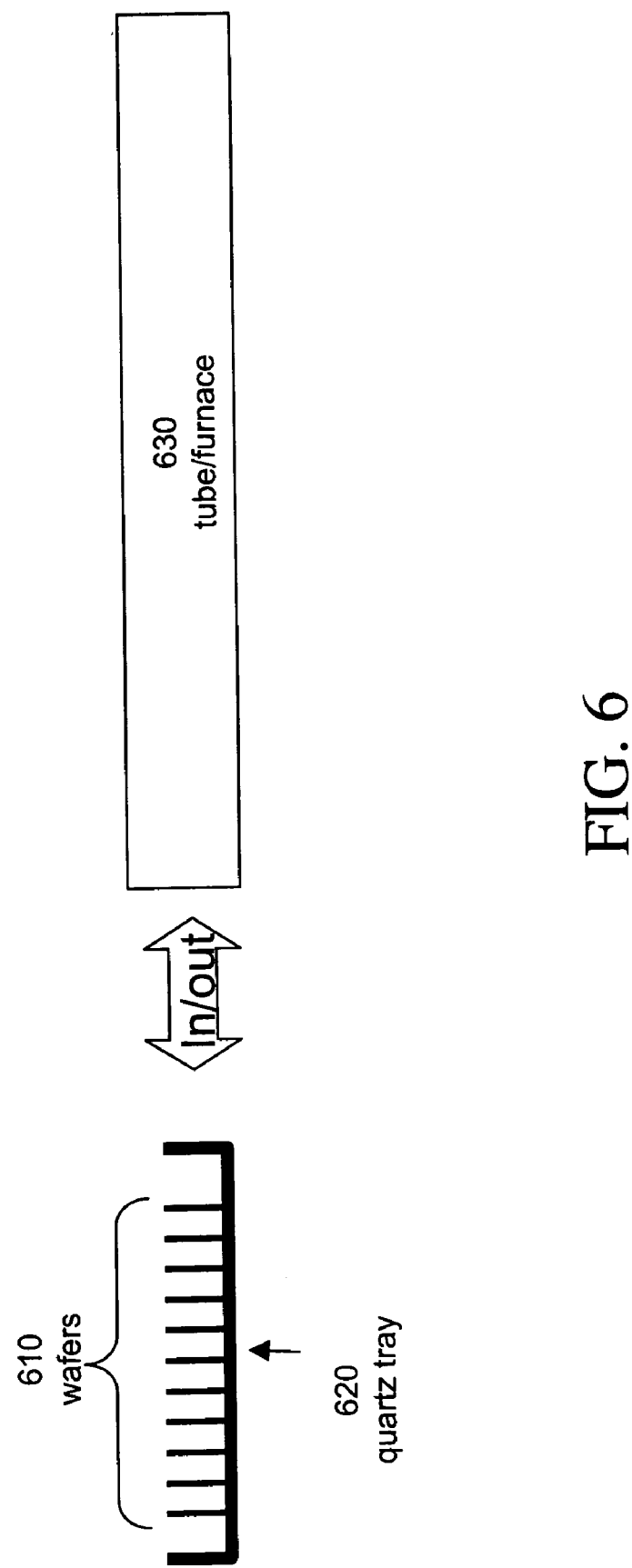
FIG. 6 depicts a structural diagram illustrating a furnace overview in accordance with the present invention.
Figure 7:
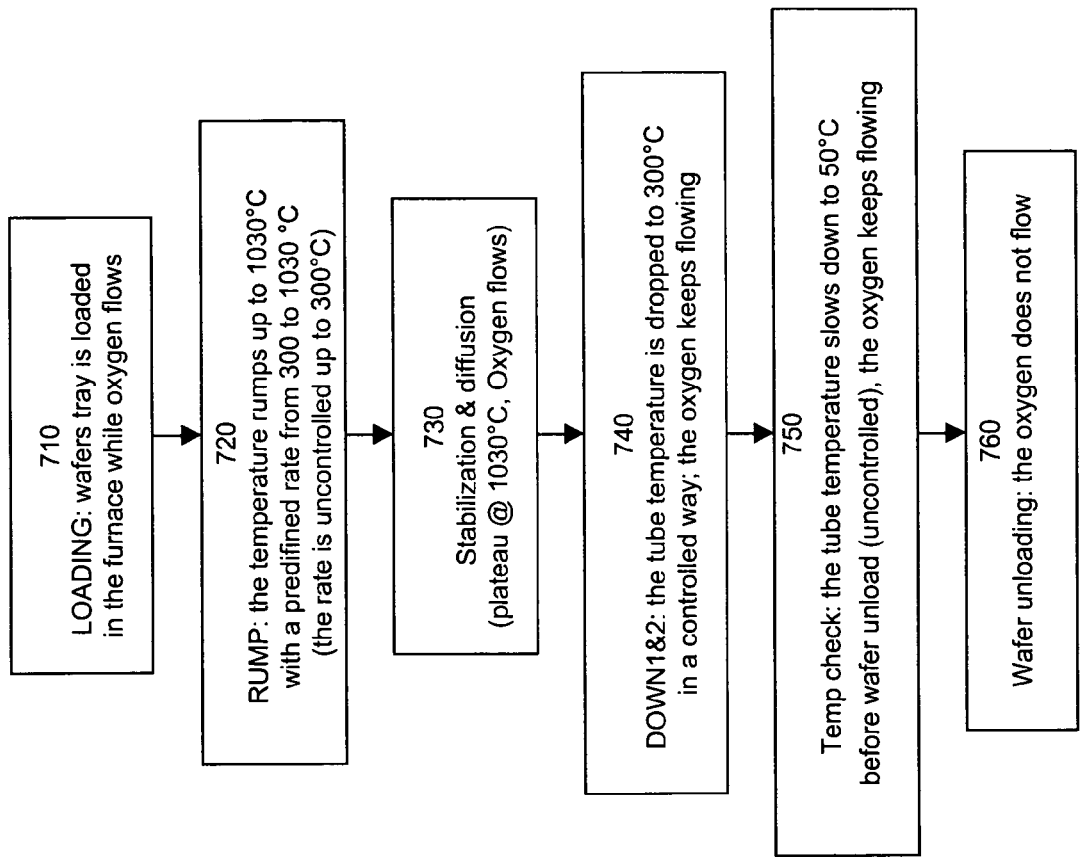
FIG. 7 depicts a flow diagram illustrating the process of electric field poling of a Ti indiffused LiNbO3 substrate in accordance with the present invention.

FIG. 6 depicts a structural diagram illustrating a furnace overview, with the process flow 700 described with respect to FIG. 7. A set of $LiNbO_3$ wafers 610 is loaded on a quartz tray 620 for movement into and out of furnace or tube 630. The quartz tray 620 automatically loads the wafers into the tube/furnace 630. During the wafers loading, the oxygen flows in the tube 630.

Figure 8:
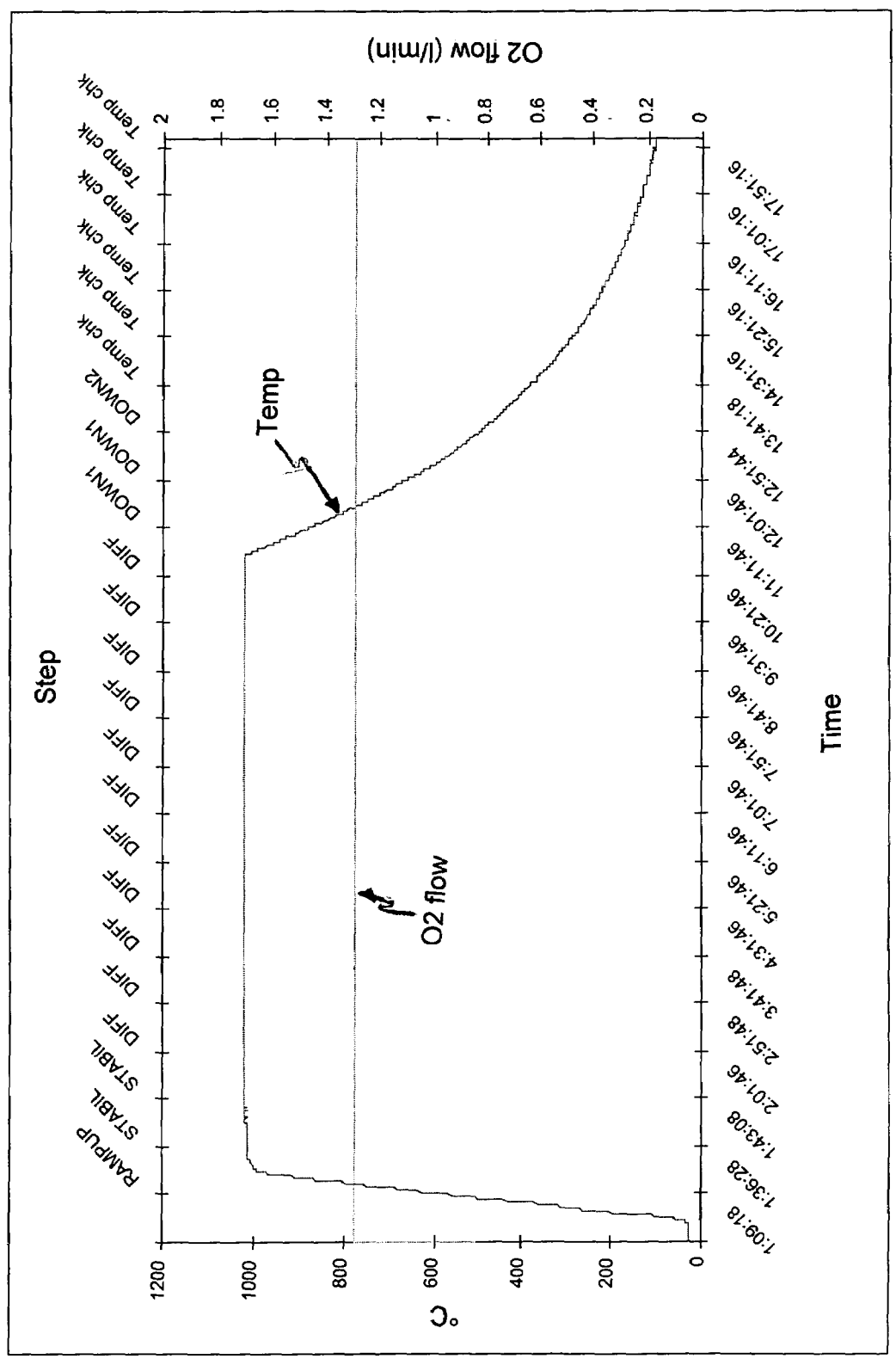
FIG. 8 depicts a graphical diagram illustrating a furnace recipe in accordance with the present invention.

At step 710, the process 700 loads a tray of wafers into the furnace 630 while oxygen is flowing. At step 720, the process 700 rumps the temperature up to 1030° C. with a predefined rate from 300 to 1030° C. It is noted that the rate is uncontrolled up to 300° C. At step 730, the process 700 stabilizes and diffuses, with the plateau at 1030° C. and oxygen flowing. At step 740, the process 700 drops the tube or furnace temperature to 300° C. in a controlled manner, while keeping the oxygen flowing. At step 750, the process 700 performs a temperature check to slow down the tube temperature to 50° C. Prior to unloading the wafer, which is done in a uncontrolled manner, the oxygen is kept flowing. At step 760, the process 700 unloads the tray of wafers, at which time the oxygen does not flow. An example of a graphical representation of a furnace recipe is shown in FIG. 8.

One of ordinary skill in the art would recognize that the present invention can be applied to devices that produce functional features of optical waveguiding and domain inversion, such post waveguides, low loss waveguides, modulators, electro-optics and frequency converters.

Those skilled in the art can now appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications, whether explicitly provided for by the specification or implied by the specification, will become apparent to the skilled practitioner upon a study of the drawings, specification, and following claims.

We claim:

1. A waveguide fabrication method, comprising:
   providing a predefined temperature with a time indiffusion range;
   indiffusing Ti into an $LiNbO_3$ substrate in a furnace at a low temperature in a specified atmosphere; and
   forming an optical waveguide on the z− crystal face of the substrate without any domain inversion occurring on the z+ crystal face; and
   poling the Ti indiffused $LiNbO_3$ substrate without having to remove a thin domain inverted layer which would otherwise appear on the z+ crystal face.
   wherein the diffusing step comprises indiffusing Ti into the $LiNbO_3$ substrate in a furnace with a lithium enriched and dry oxygen atmosphere.

2. The method of claim 1, after the forming step, further comprising applying high voltage pulses via liquid or solid electrodes.

3. The method of claim 1, further including forming a predefined pattern of insulating material on the z− crystal face.

4. The method of claim 3, wherein the insulating material is $SiO_2$.

5. The method of claim 1, wherein the predefined temperature is 1030° C.

6. A method for waveguide fabrication process, comprising:
   providing a predefined temperature with a time indiffusion range;
   indiffusing Ti into an $LiNbO_3$ substrate in a furnace with a $Li/O_2$ enriched atmosphere; and
   forming an optical waveguide on the z− crystal face without any domain invasion occurring on the z+ crystal face.

7. The method of claim 6, wherein the step of indiffusing Ti into the $LiNbO_3$ substrate is performed at a low temperature.

8. The method of claim 7, after the forming step, further comprising applying high voltage pulses via liquid electrodes.

9. The method of claim 8, further comprising poling the Ti indiffused $LiNbO_3$ substrate without the need of removing a thin domain inverted layer which would otherwise appear on the z+ crystal face.

10. The method of claim 6, wherein the $Li/O_2$ enriched atmosphere in the furnace substantially prevents $Li_2O$ outdiffusion.

11. A method for use in forming a waveguide, comprising:
    placing at least one $LiNbO_3$ wafer on tray while flowing oxygen through a tube;

positioning the tray and the at least one LiNbO$_3$ wafer into the tube and increasing a temperature in the tube to a predetermined temperature while flowing oxygen through the tube;

indiffusing Ti into the LiNbO$_3$ wafer and forming the waveguide while flowing oxygen through the tube;

reducing the temperature in the tube to a predetermined temperature while flowing oxygen through the tube; and stopping the flow of oxygen through the tube and removing the tray from the tube.

12. The method of claim 11, further comprising removing the LiNbO$_3$ wafer from the tray and poling the Ti indiffused LiNbO$_3$ wafer without having to remove a thin domain inverted layer which would otherwise appear on the z+ crystal face.

* * * * *